(12) United States Patent
Vakil et al.

(10) Patent No.: US 7,466,723 B2
(45) Date of Patent: Dec. 16, 2008

(54) VARIOUS METHODS AND APPARATUSES FOR LANE TO LANE DESKEWING

(75) Inventors: Kersi H. Vakil, Olympia, WA (US); Adarsh Panikkar, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 938 days.

(21) Appl. No.: 10/881,097

(22) Filed: Jun. 29, 2004

(65) Prior Publication Data

US 2005/0286565 A1    Dec. 29, 2005

(51) Int. Cl.
*H04J 3/06* (2006.01)
(52) U.S. Cl. ............... 370/503; 370/508; 370/517; 375/371; 375/372; 375/369; 713/500; 713/501; 713/502; 713/503; 713/600; 326/21; 326/26; 326/28; 326/31; 326/93
(58) Field of Classification Search .............. None
See application file for complete search history.

(56) References Cited

U.S. PATENT DOCUMENTS

| | | | |
|---|---|---|---|
| 6,009,488 A | 12/1999 | Kavipurapu | |
| 6,445,234 B1* | 9/2002 | Yoon et al. ............... 327/161 |
| 7,054,331 B1* | 5/2006 | Susnow et al. ............ 370/465 |
| 2004/0071250 A1* | 4/2004 | Bunton et al. ............ 375/372 |
| 2004/0123190 A1* | 6/2004 | Toyoda et al. ............ 714/700 |

OTHER PUBLICATIONS

U.S. Appl. No. 10/749,721, filed Dec. 31, 2003, entitled, "Lane to Lane Deskewing via Nono-Data Symbol Processing for a Serial Point to Point Link".

* cited by examiner

*Primary Examiner*—Chi H. Pham
*Assistant Examiner*—Raj K Jain
(74) *Attorney, Agent, or Firm*—Blakely, Sokoloff, Taylor & Zafman LLP

(57) ABSTRACT

Various methods, apparatuses and systems are described in which a skew delay time between communication lanes is determined. A data transfer path is established which includes two or more communication lanes in a communication link. A skew delay time is determined between the communication lanes of the communication link with respect each other with using a clock period of a input output circuit as a reference time.

13 Claims, 7 Drawing Sheets

VARIOUS METHODS AND APPARATUSES FOR LANE TO LANE DESKEWING

FIELD

Aspects of embodiments of the invention relate to the field of input output (I/O) circuit design; and more specifically, to the skew between lanes of a communications device containing multiple input output circuits.

BACKGROUND

Communication systems employing multiple channels, i.e. lanes, may carrying data with forwarded or embedded clock information. These communication systems should have some means of deskewing the received information before further data processing can be done. Skew can be a term referring to when two or more signals originally start out with a known timing relationship but lose the time reference with respect to each other. The signals should be deskewed to restore the timing relationship.

A previous deskewing approach typically uses a deskewing state machine in the data link layer to compensate for skew between the lanes. The compensating time period is a set period of time normally a set number of bits established by the platform guidelines. This lane-to-lane skew cancellation by the data link-layer may introduce a high latency penalty since the data link-layer for a typical serial I/O interface runs at a slower clock frequency than the clock frequency found in a typical I/O interface circuits.

Some deskew techniques may use an extra step of externally analyzing an amount of skew by a component external to the I/O circuit to then implement a mechanism to correct the amount of skew present in each lane with respect to the other lanes.

BRIEF DESCRIPTION OF THE DRAWINGS

The drawings refer to embodiments of the invention in which.

Figure 1:
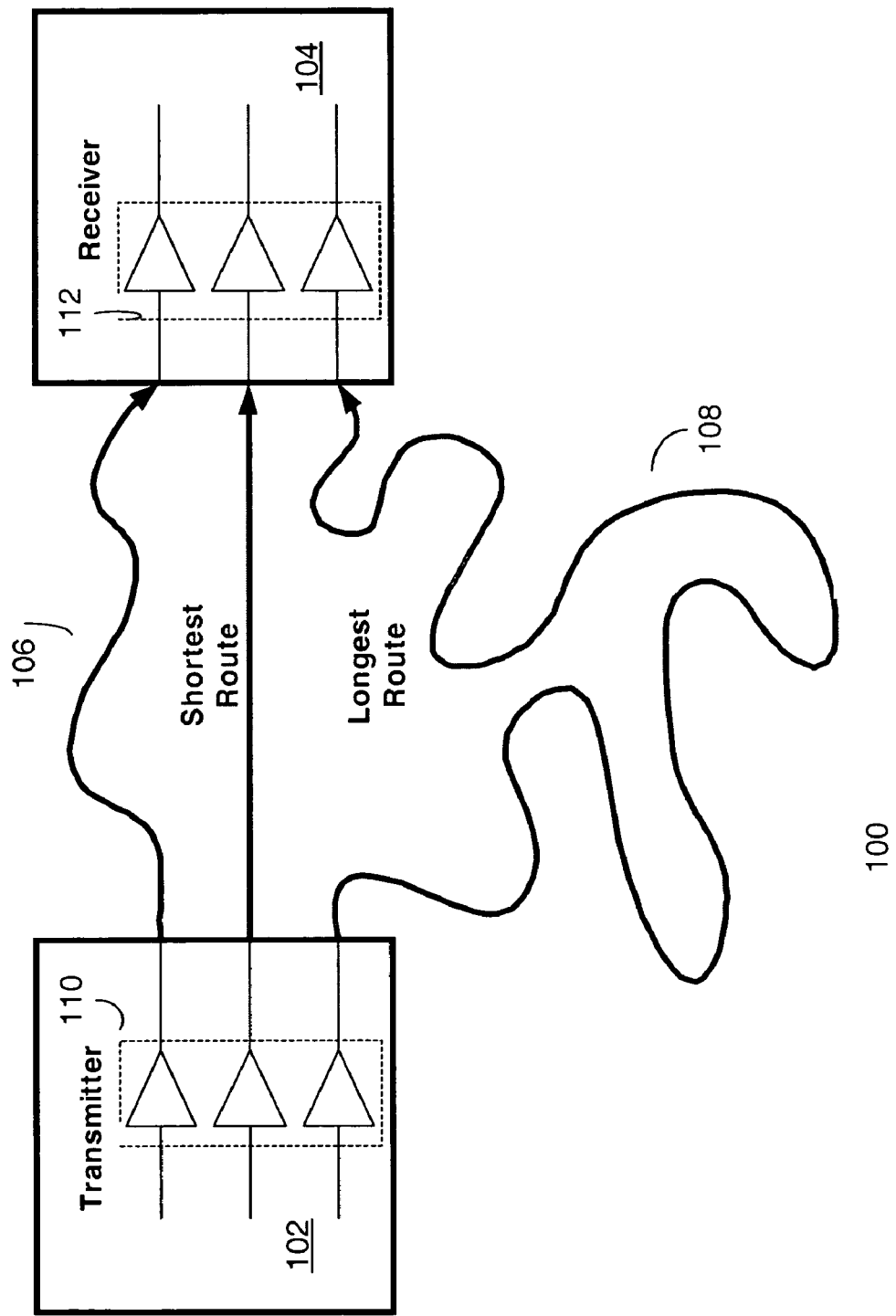
FIG. 1 illustrates a block diagram of an embodiment of a communication system having a communication link between a first agent acting as a transmitter and a second agent acting as a receiver with a skew difference between lanes.

While the invention is subject to various modifications and alternative forms, specific embodiments thereof have been shown by way of example in the drawings and will herein be described in detail. The embodiments of the invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of flip flops, etc., in order to provide a thorough understanding of the embodiments of the invention. It will be apparent, however, to one of ordinary skill in the art that the embodiments of the invention may be practiced without these specific details. However, the specific numeric reference should not be interpreted as a literal sequential order but rather interpreted that the first flip flop is different than a second flip flop. Thus, the specific details set forth are merely exemplary. The specific details may be varied from and still be contemplated to be within the spirit and scope of the present invention.

In general, various methods, apparatuses and systems are described in which a skew delay time between communication lanes is determined. A communication link is established between a first agent acting as a transmitter and a second agent acting as a receiver. A point to point or shared interconnect data transfer path is established which includes two or more communication lanes in that communication link. A skew delay time may be determined between the lanes of the communication link with respect to each other with using a clock period of an I/O circuit as a reference time interval. The skew present between the lanes with respect to each other may be corrected based upon using the clock period i.e. clock speed of the I/O circuit in the physical layer as the reference time interval. The skew in each lane may be corrected based on the difference in time of the skew present in that lane and the actual skew present in a slowest lane.

FIG. 1 illustrates a block diagram of an embodiment of a communication system having a communication link between a first agent acting as a transmitter and a second agent acting as a receiver with a skew difference exists between lanes. A transmitting agent 102 may have a first I/O circuit 110. A receiving agent 104 may have a second I/O circuit 112. The electronic system 100 may be composed of several elements that are designed to communicate with one another over communication links via the I/O circuits. For instance, a modern computer system may include the following agents: a processor; main memory; and a system chipset. Each agent may include one or more I/O circuits. For example, the processor may have multiple I/O circuits that allow the processor to communicate with the main memory and a graphics element in the system chipset.

An interconnect medium between the two agents 102, 104 may have two or more lanes 106, 108, i.e. channels, to carry information in multiple signals that could each carry embedded timing information that relates to each other.

A communication lane may be a point to point or shared interconnect communication link. Multiple lanes may exist, for example, in the form of a parallel bus. The parallel bus may carry for example a 128 bit signal wide signal as well as packets of information in a parallel form that need to be decoded upon reception. When a communication link is established between an agent acting as a transmitter and an agent acting as a receiver, then a given number of lanes will be used to carry the information between the two agents.

A point to point link, such as a PCI Express point to point link, may have one or more lanes that can operate simultaneously. Each lane has dual, unidirectional paths, which are also simultaneously operable. Each path may have a single set of transmitter and receiver pairs (e.g., a transmitter in a port of the first agent, and a receiver in a port of second agent). In that case, the transmitter and receiver may drive and sense a interconnect medium such as a pair of metal traces in a printed circuit board that may traverse a board-to-board connector. Alternatively, other interconnect media may be provided, such as optical fiber.

Skew may be introduced at the transmission time, or more likely because of mismatches in the length of the interconnect between transmitting and receiving agents. For example, the two or more lanes 106, 108 may have different propagation delays and/or phases for transmission of data on the various lanes. The different propagation delays and/or phases for transmission of data on the various lanes 106, 108 results in a possible lane-to-lane skew at the receiving agent 104. Trace-matching of interconnect for multiple lanes is tedious, and at times unfeasible, given routing congestions and obstructions that may be present. As I/O transfer speeds continue to increase, the trace mismatches between various lanes may result in an increasing number of bit cells worth of skew and misalignment.

Deskewing can be the operation performed at the receiving end which negates/cancels out any skew between all involved communication lanes, such that data streams regain time and/or phase relationships with respect to each other. Communication systems employing multiple channels (i.e. lanes) carrying data with forwarded/embedded clock information should have some means of deskewing the received information before further data processing can be done.

A communication lane in the electronic system 100 may be implemented in a three layer architecture consisting of a Data Link Layer, a Physical Layer, and a Transaction Layer. The Physical Layer performs the actual transmitting and receiving of data across an established link. The Transaction Layer begins the process of turning a request or completion data coming from a device core into a data packet for a transaction. The Data Link Layer may ensure that packets going back and forth across a link are received properly (via techniques such as error correcting codes).

The Physical Layer in a given device interacts with its Data Link Layer (in the same device) on one side, and with the metal traces, optical fiber, or other transmission medium that is part of the link, on another side. The Physical Layer may contain circuitry for the transmitters and receivers, parallel to serial and serial to parallel converters, frequency and phase control circuits, and impedance matching circuitry. A layered architecture may permit easier upgrades by, for example, allowing reuse of essentially the same Transaction and Data Link Layers, while upgrading the Physical Layer (e.g., increasing transmit and receive clock frequencies).

The Physical Layer of the transmitting agent receives a packet of data and transforms it into a serial data stream (perhaps after adding framing data to it), and transmits the stream using, for example, an electrical, differential signal having timing rules. Once the Physical Layer in the receiving agent detects the signal at its receiver input, the Physical Layer samples the signal to recover the data stream, and builds the stream back into a data packet (e.g., after removing the framing). The packet is then passed up to the Data Link Layer in the receiving agent, which strips the headers and checks for errors; if there are no errors, the packet is passed up to the Transaction Layer where the memory read request is extracted and then sent to the appropriate logic function to access the locations specified in the request.

The I/O circuit configured with deskewing logic in the physical layer, for example in the first I/O circuit 112 determines a direct relationship to the number of I/O circuit clock pulses to complete the deskew operation based on the actual skew present between the lanes rather than a set number of bits established by the platform guidelines. The deskewing logic may reside in other portions of an agent but the location of within an I/O circuit will be used as an example location for the remainder of this description. An example deskew trigger circuit is described in FIG. 2.

Figure 2:
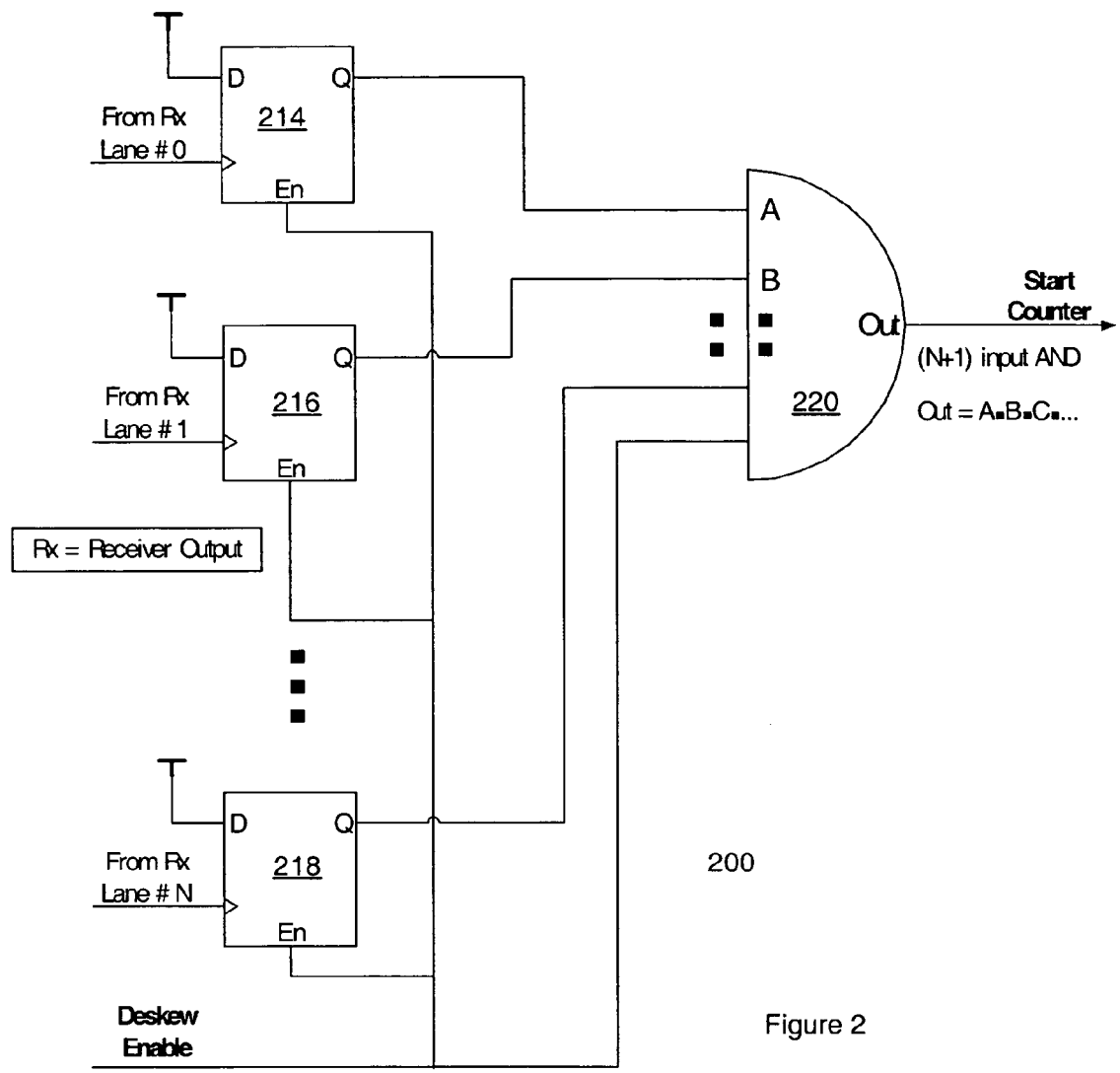
FIG. 2 illustrates a block diagram of an embodiment of a trigger portion of a deskew circuit of an agent configured to receive signals.

FIG. 2 illustrates a block diagram of an embodiment of a trigger portion of a deskew circuit of an agent configured to receive signals. The trigger portion of the deskew circuit 200 has three D flip-flops, a first D flip-flop 214, a second D flip-flop 216, and a third D flip-flop 218. The output from the Q output on each of the D flip-flops 214-218 goes to an AND logic gate 220. The D input of the D flip-flops 214-218 couples to a logical 1 (i.e. Vcc). The clocking input of the D flip-flops 214-218 couples to the output of the I/O receiver circuitry. The input sensed on the clocking input may be a protocol training sequence from the transmitting agent. The enable input of the D flip-flops 214-218 couples to a control signal, such as a bit lane deskew enable signal, from the receiving agent's Data Link Layer, processor core, or other similar layer.

The triggering circuit of the deskew logic 200 starts the deskew operation between the lanes after both 1) an initialization sequence occurs in the protocol establishing the communication link between an agent transmitting information and the I/O circuit and 2) a lane with the greatest skew delay has been detected.

After a known initialization sequence, the transmitting agent begins sending a training sequence, for example, a long sequence of 0's followed by 1's followed by 0's. A higher layer than the physical layer such as the Data Link (protocol) Layer, the processor core, etc in the receiving agent recognizes the completion of the initialization sequence across all lanes and in turn, asserts a control enable signal to instruct the I/O logic to initiate/arm the trigger mechanism. Generally, logic in the higher layer than the physical layer detects assertion of the control enable signal only once after component level reset.

Next, after the control enable signal asserts to enable the D flip flops, the training pulses come across the lanes into the clocking input of each of the D flip-flops 214-218. When the training pulse for a particular D-flip flip transitions on the 0 to 1 transition of the pulse, then output of that flip flop changes to a logical 1. For example, on the rising edge of the training pulse for the first D flip flop 214, then the output of the first flip flop 214 changes to a logical 1. When the D flip flop of the slowest lane to transition changes its output from logical 0 to logical 1, then that provides the needed last logical 1 input to the AND logic gate to cause that AND logic gate to transition its output from a logical 0 to a logical 1.

The control enable signal may be asserted sometime after the end of the initialization sequence and during the training sequence. For example, the control enable signal may be asserted during the first long sequence of 0's in the training sequence, but before the start of the long sequence of 1's for the fastest lane in the communication link. This can be easily implemented by allowing a sufficiently long deskew training sequence.

The trigger portion of the deskew circuitry 200 may be shared by all the lanes. This shared common trigger circuit 200 is configured to receive 1) the input from each lane on when that lane transitions to a predetermined logic state and 2) an input from a higher layer than the physical layer such as the Data Link Layer, the processor core, etc, to enable the start of the determination of the skew delay time between the lanes of the link with respect to each other. By receiving those inputs, the trigger portion of the deskew circuitry 200 establishes when the lane with the greatest amount of skew delay time transitions logic states so that each lane may determine the skew delay time relative to each other.

The flip flops 214-218 and AND logic gate 220 may be initially reset 1) at the start of the protocol prior to the initiation of the training sequence, such as at link reset, or 2) before an event occurs in the training sequence such as during the long string of 0s before the strings of 1s starts.

Figure 3:
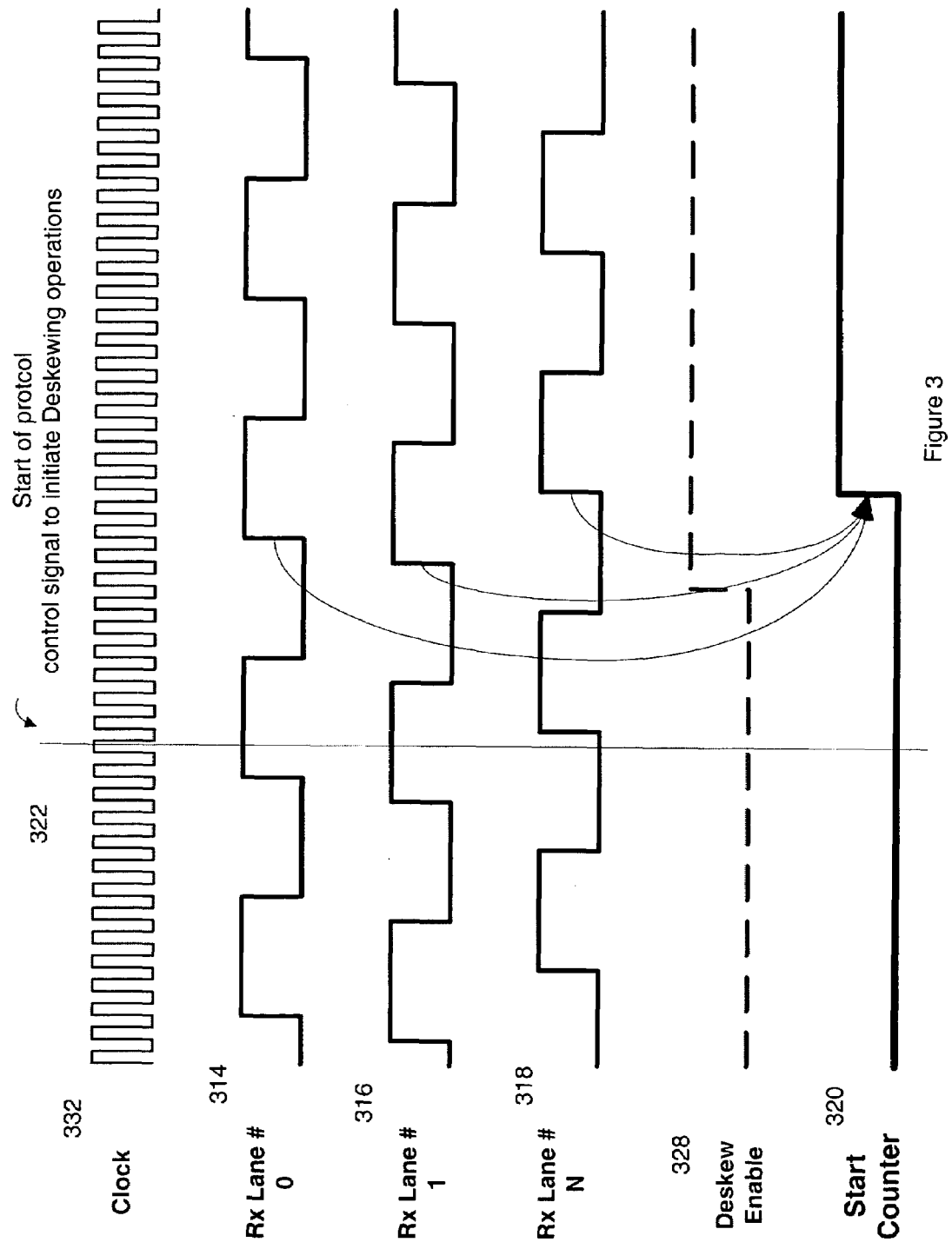
FIG. 3 illustrates a timing diagram of an embodiment of the trigger portion of the deskew circuit illustrated in FIG. 2.

FIG. 3 illustrates a timing diagram of an embodiment of the trigger portion of the deskew circuit illustrated in FIG. 2. The timing diagram contains training sequence inputs from lane 0 through lane N 314-318, a control enable signal 328, a start counter signal output from the AND logic gate 320, as well as the clock rate of the I/O circuit 332. The agent acting as a transmitter sends over the protocol with the training sequence and each of the lanes receives the skew delayed training sequence 314-318 on its input. The training sequence 314-318 sensed by the D-flip flops of lane 0 through lane N does not affect the output of AND logic gate until the control enable signal 328 is asserted. When the control enable signal 328 is asserted, that allows the skew circuitry to determine the skew between the various lanes. When the D-flip flop of the last lane transitions from 0 to 1, in this case, lane N 318, then the AND logic gate 320 transitions from a 0 to a 1 on it's output. Thus, the "Start Counter" signal 320 is asserted after both the control enable signal 328 is asserted and the last (slowest) lane experiences a transition from a logical 0 to a logical 1. Note, the logical 1 may be a single bit in width or a long series of bits in width. Depending on implementation, the output of the AND gate, i.e. Start Counter signal 320, can be used to either to start a counter or to stop one that is already running.

The length of the deskew training sequence may be dependant on the number lanes in the communication link and maximum expected skew between lanes. The length of the deskew training sequence may be modifiable in the protocol to account for different system architectures/topologies and set to a system specific worst case expected skew because of board routing and the I/O bit-rate rather than forcing the system architecture to adhere to lane-to-lane trace matching requirements. Thus, the deskew logic in combination with the variable length training sequence can eliminate lane routing constraints when designing circuits. The training sequence of 1's and 0's in the protocol may have a minimum overhead impact on the protocol. Further, board design constraints and manufacturing costs can be reduced dramatically, since lane-to-lane trace matching requirements can be relaxed by merely adding the deskew logic and the training sequence to the protocol.

Alternatively, the deskew sequence may follow a known initialization sequence and at some known point in the link initialization process the protocol signaling from the transmitter initiates a control signal 322 to purposely trigger the deskewing operation. The deskewing logic in the receiving agent remains disabled until that point, through which the timing for arming the deskew circuitry can be deterministically controlled. The deskewing logic remains disabled so that input signals to the I/O circuit can transition logic states from 1 to 0 and 0 to 1 without triggering the mechanism to determine the skew between the lanes.

In an embodiment, once the skew is determined for each lane, then the skew need not be redetermined because the communication path length remains the same for the duration of that communication link. An example deskew counter circuit implemented by an assertion of the AND gate output signal is described in FIG. 4.

Figure 4:
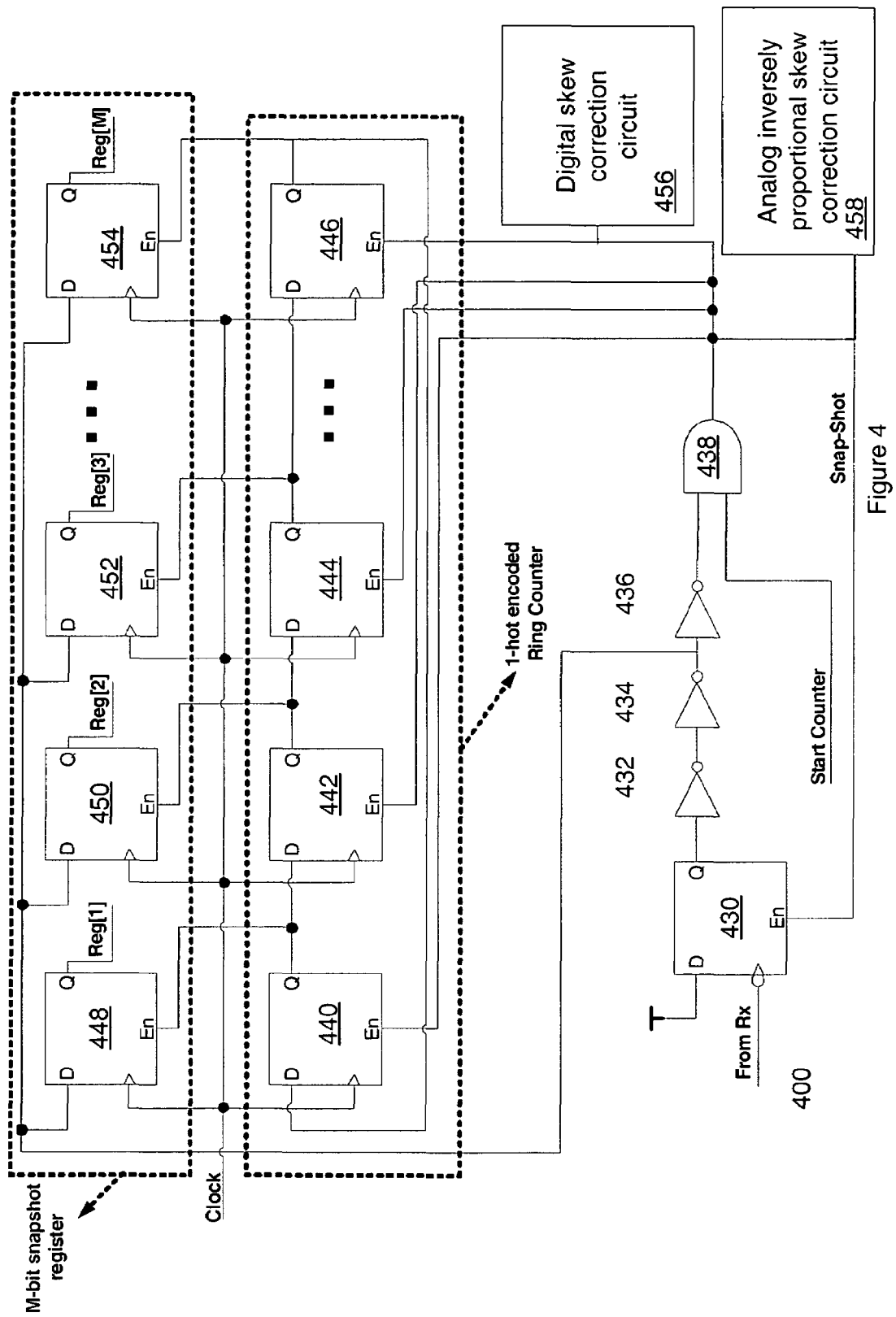
FIG. 4 illustrates a block diagram of an embodiment of a counter circuit to determine the skew among the lanes and to store the amount of that skew in order to compensate for that skew.

FIG. 4 illustrates a block diagram of an embodiment of a counter circuit to determine the skew among the lanes and to store the amount of that skew in order to compensate for that skew. Each counter circuit receives an input from the triggering circuit in order to store the skew delay time of that lane relative to the lane with the greatest skew delay. A counter circuit may exist for each lane or a single counter circuit may exist for all the lanes. The example counter circuit 400 for a single lane may contain a first flip-flop 430, a first through a third inverter gate 432-436, a first AND gate 438, a first set of D flip-flops including a second D-flip-flop 440 through an Mth D flip-flop 446, and a second set of flip-flop registers including a sixth flip-flop register 448 through an Mth flip-flop register 454. The first AND gate 438 receives an input from the start counter AND gate 220 in FIG. 2.

The first set of D flip-flops 440-446 may be configured to form a ring-counter that has one flip-flop, for example, the second flip flop 440 preset to a logical 1 at reset and all other Flip-flops 442-446 set to a logical 0. Structurally, the Q output of one of the D flip flops 440-446 is the input to the D input of an adjacent flip flop 440-446. The second set of flip-flop registers 448-454 form an M-bit snapshot register. At any given time, only one flip-flop register 448-454 is enabled. The first set of D flip-flops 440-446 set up a pointer to enable one of the second set of flip-flop registers 448-454 at any given point in time. As the ring counter sequences through the first set of flip flops 440-446, merely the flip flop 448-454 register associated with the flip flop register active in the ring counter will be enabled. Accordingly, merely one of the flip flop registers 448-454 eventually contains how many I/O circuit clock cycles, (i.e. time differential) that this particular lane is away from the lane with the greatest skew delay. Thus, one of those flip flop registers 448-454 acts as a status register, stores the skew delay time of this lane relative to the skew delay time of a slowest lane. The amount of that skew result can be read out from the status register. Accordingly, the skew status register can be over-ridden for design for test/design for debug purposes.

In operation, the flip flop 430 may reset at power ON/link initialization. The first AND gate 438 initially starts with a logical 1 on its first input from the third inverter 436. The first AND gate 438 initially outputs a logical 0. The second input to the first AND gate 438 receives a logical 1 from the start counter AND gate 220 in FIG. 2 when that circuit triggers. The ring counter does not start until the "Start Counter" signal goes high. When the trigger portion of the deskew circuit sends a signal indicating that the last lane transitions logic states, then the AND gate 438 output goes high to the enable input of the first set of the D flip flops 440-446. The first set of D flip flops 440-446 sequentially output a logic one on every corresponding I/O circuit clock cycle. Once enabled, the ring counter rotates the logical 1 output from flop-to-flop 440-446 in sequential order with every clock cycle. The ring counter is disabled once the receiver sees a transition on the training pulse from the logical 1 to logical 0. The same training pulse input from the receiver sensed by the flip flop in FIG. 2 is sensed by the first flip flop 430. The outputs of the D flip flops 440-446 in the ring counter serve as write pointers that sequentially enable one flip-flop of the M-bit snapshot register 448-454.

For example, on the initial I/O clock cycle, the second D flip flop 440 outputs a logic 1 to enable the corresponding M-bit flip flop register 448 while the other flip flops 442-446 in the ring counter output a logic 0 to disable their corresponding M-bit flip flop registers 450-454. On the next clock cycle, the third flip flop 442 enables the seventh M-bit flip flop register 450 while the other flip flops in the ring counter 440, 444, 446 output a logic 0 to disable their corresponding M-bit snap-shot registers 448, 452, 454.

However, when the training pulse signal on that lane transitions from a logical 1 to a logical 0, then the output of the first flip flop 430 output transitions from a 0 to a 1. The first flip flop 430 is a negative edge triggered device. The Q output transitions on the first flip flop 430 from a 0 to a 1. The transition of the 0 to a 1 is fed through the inverter chain 432-436 over to the first AND logic gate 438 which changes the output of the first AND logic gate 438. The transition of the output of the first AND logic gate 438 stops the ring counter circuit 440-446 from counting time increments, i.e. clock cycles by removing the asserted enable signal on the first set of D flip flops 440-446. The round robin passing of the logical 1 on the output of the first set of D flip flops 440-446 stops. The Mbit register 448-454 enabled last from the first set of D flip flops 440-446 then stores the value of the actual skew delay time of that lane. Thus, that Mbit register keeps track of the number of clock cycles between when the start signal occurred and when the training pulse on that lane had a negative transition.

The inverter chain 432-436 may also insure the that flop-to-flop setup and hold timings are satisfied. The inverter chain 432-436 initially puts a logical 0 on the D input for all of the flip flop registers 448-454.

The output of the first AND gate 438 provides several functions. The output enables the D flip flops of the ring counter 440-446, enables the first flip flop 430 to receive the logic transition to stop the counter circuit, and sends a signal to either or both a digital skew correction circuit 456 and an analog skew correction circuit 458.

The final deskew correction operation can be performed in several ways. Three example methods are briefly described below.

The digital skew correction circuit 456 receives the output of the first AND gate 438 to establish when the skew determination process has stopped. The digital skew correction circuit 456 also monitors the contents of the second set of flip flop registers 448-454. In the digital skew correction circuit 458, the Mbit register value in the set of flip flop registers 448-454 may indicate how many flip flops in a delay network of flip flops, the packets on that lane need to be traveled through before the received input signals are sent to the core. The delay network of flip flops can be added onto the datapath for normal operation to insert the corrective digital delay. The number of flip-flops added or enabled can be inferred from the status value stored in the M-bit register. Accordingly, the digital skew correction circuit in the receiving agent acts on the status of the M-bit register to introduce delay in various lanes to match the skew delay time of the slowest lane.

In the analog skew correction circuit 458 implementation, the snap shot output of the first AND gate 438 is also monitored. The analog skew correction circuit 458 generates a signal delay inversely proportional to the pulse width, i.e. period, of the snap shot output of the first AND gate 438. The inversely proportional signal to the duration of the output of the first AND gate 438 when added to received signals on this lane compensates this lane for its skew delay time. The analog skew correction circuit 458 may use a resistor-capacitor timer with a charge-holding circuit, a delay locked loop, or similar circuit to skew compensate packets from that lane.

Typically, the I/O receiver circuitry replicates the input signal and sends the input signal to the main circuit such as the core. In the digital implementation, a network of delay flop flips exist between the output of the I/O circuit and the main circuit/core. The network of delay flop flip are configured to enable a number of flip flops equal to the delay indicated by the snapshot registers to form a path between the I/O circuit and the main circuit/core. In the analog implementation, the granularity of the latency is improved. The digital implementation may have a latency of an I/O circuit clock pulse. The analog implementation may have a latency of a fraction of that clock pulse being directly the inverse width of the output signal from the AND logic gate.

A Status Register Look-up may also be implemented to correct the skew differences between the lanes. The entire M-bit register 448-454 of each lane is read by the Data Link/protocol Layer in the receiving agent. Subsequently, a state-machine circuit can identify the slowest lane and provide control signals to each individual lane to add flip flop-staged delays to equal that of the slowest lane.

In an embodiment, the ring counter may have a minimum depth of big enough to accommodate the greatest amount of anticipated skew.

Figure 5:
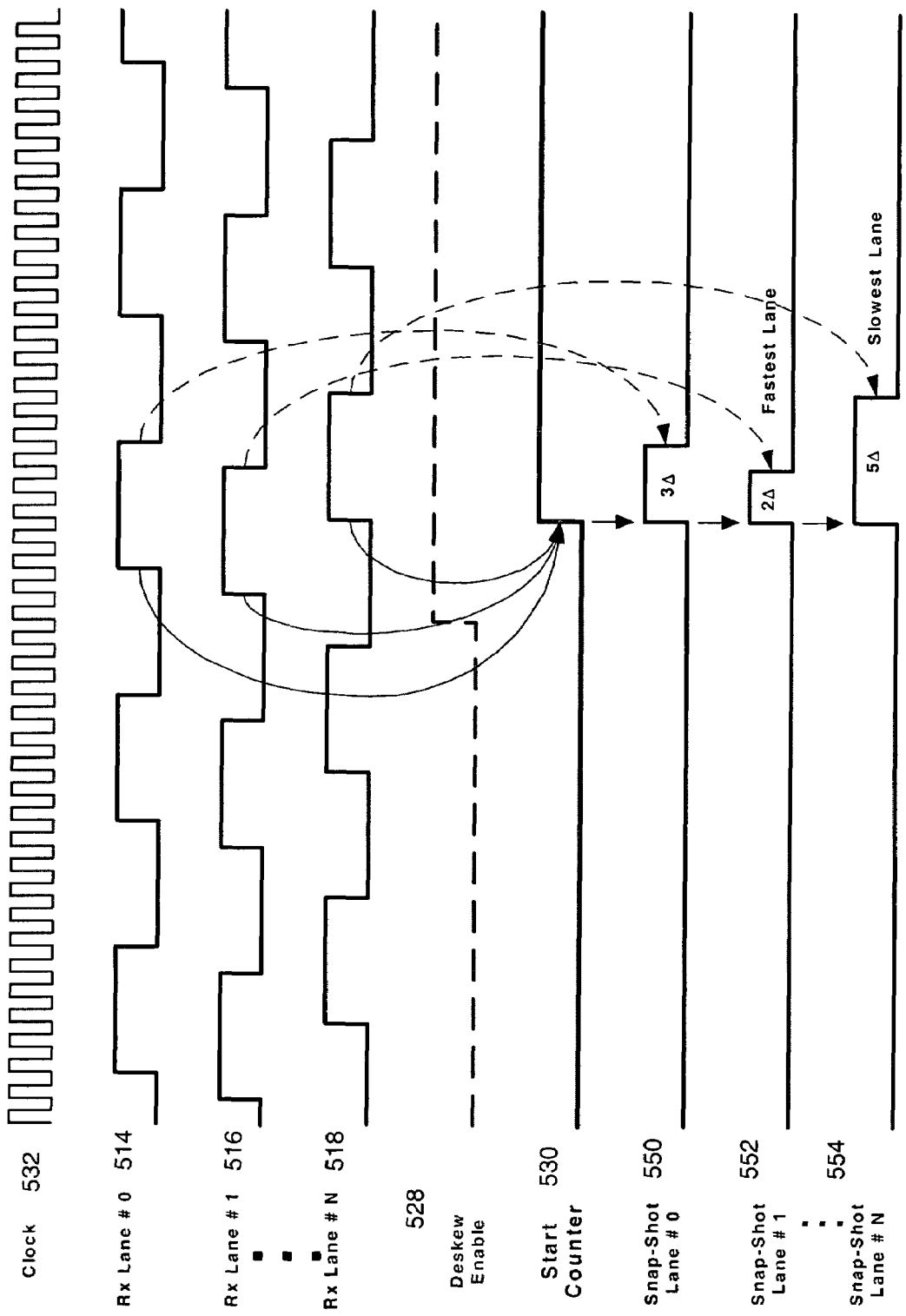
FIG. 5 illustrates a timing diagram of an embodiment of skew delay determinations from the various lanes.

FIG. 5 illustrates a timing diagram of an embodiment of skew delay determinations from the various lanes. The timing diagram includes the training sequences inputs into lane 0 through N 514-518, the control enable signal 528 from the layer higher than the physical layer, a signal showing when the trigger portion generates the start counter signal 530, the skew delay time determinations for various lanes 550-554 that is stored in the D flip flop registers of the deskew circuitry for each lane, and the I/O circuit clock 532.

As can be seen in the timing diagram, the pulse width of each skew delay time determination signal 550-554 may be directly proportional to the time difference between the slowest lane transitioning from a 0 to a 1 in the long training sequence and the individual respective lane training pulse transitioning from a 1 to 0. Also to be noted is that the pulse width of each lane's skew delay time determination signal 550-554 is unique multiples or even fractions of the I/O clock cycle time-periods. Also, the relative widths of these skew delay time determination signals 550-554 for the different lanes are proportional to the actual relative skew between the various lanes.

The skew delay time determination signals 550-554 may be what the time differential is for that particular circuit in a digital correction implementation or the inverse of the analog signal generated off of the Snap-Shot of the first AND gate 438 in FIG. 4. Each lane has a register that stores a delta directly representing how much time delay exists between the activation of the slowest lane and its own transmission time. Thus, the register stores each lane's own actual skew delay time with respect to the amount of skew delay time in the slowest lane.

The skew delay time between the communication lanes of the communication link is determined with respect each other with using a clock speed of an I/O circuit as a reference time. Thus, the analog skew correction circuit, the digital skew correction circuit, and the status register technique have used the clock speed of the I/O circuit as the reference time to correct the skew for that lane. Accordingly, the clock speed of the I/O circuit as the reference time may be used as the clocking reference rather then the typically slower clock speed of a state machine in the Data Link Layer or the chipset processor core as a reference time. The clock period of these layers could be, for example, equal to the width of each training pulse.

Figure 6:
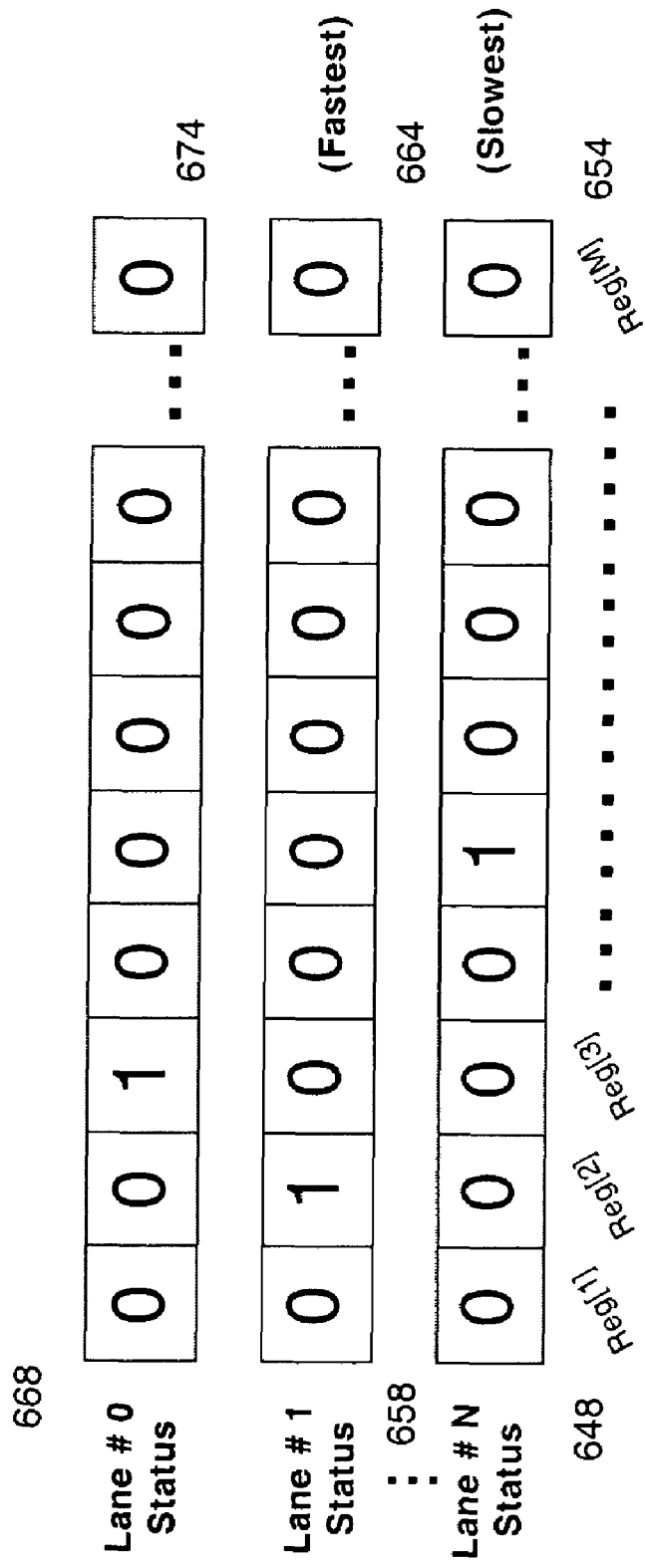
FIG. 6 illustrates block diagram of an embodiment of the contents stored in the status flip flop registers in FIG. 4.

FIG. 6 illustrates block diagram of an embodiment of the contents stored in the status flip flop registers 448-454 in FIG. 4. The 0 through 1 in the registers 648-654 correspond to the contents stored in the flip flop registers 448-454 of lane N, which happens to be the slowest lane in this particular example. Flip flop registers 658 to 664 store the skew delay time of another lane such as lane 1. Flip flop registers 668 to 674 store the skew delay time of another lane such as lane 0.

Figure 7:
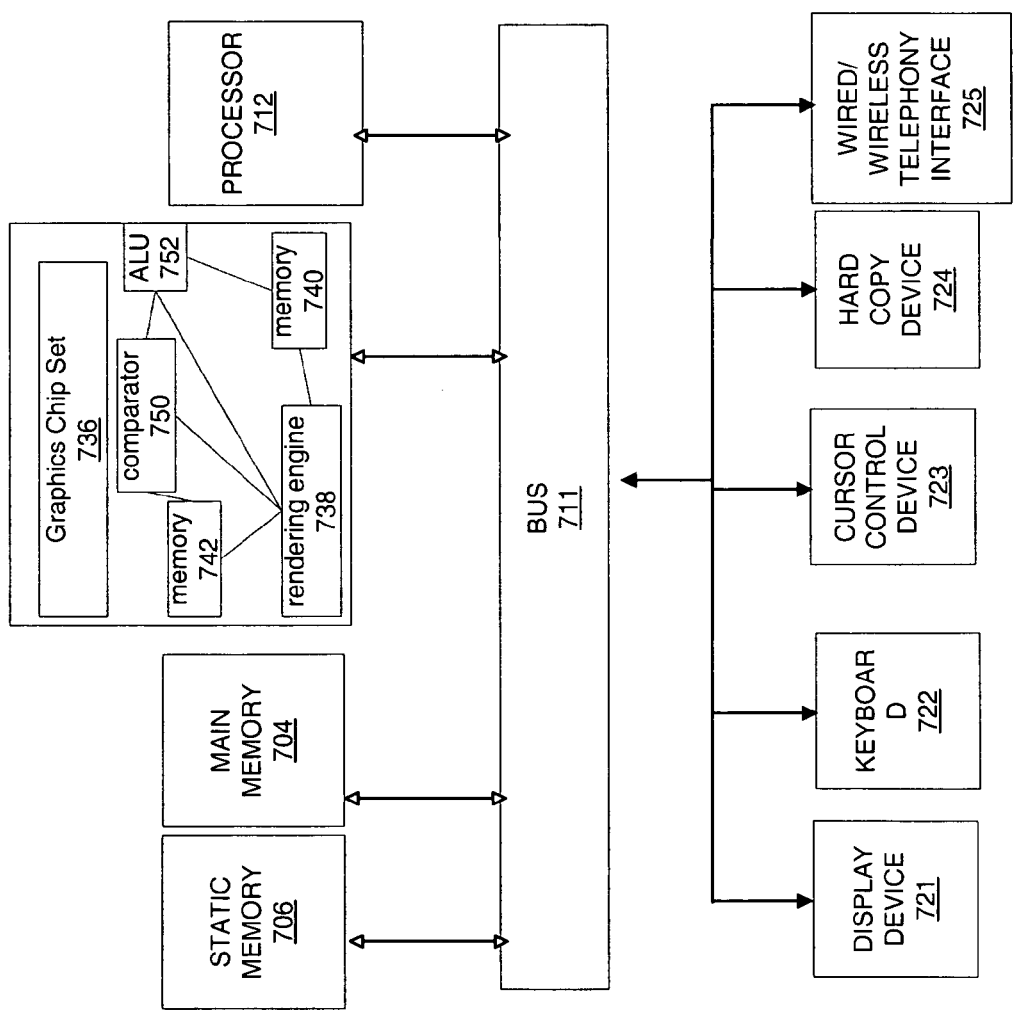
FIG. 7 illustrates a block diagram of an example computer system that may use an input output circuit with deskewing logic configured to determine a direct relationship to a number of input output circuit clock pulses to complete a deskew operation based on an actual skew present between lanes carrying signals with information that could each have embedded timing information that relates to each other.

FIG. 7 illustrates a block diagram of an example computer system that may use an I/O circuit with deskewing logic configured to determine a direct relationship to a number of I/O circuit clock pulses to complete a deskew operation based on an actual skew present between lanes carrying signals with information that each have embedded timing information that relates to each other. In one embodiment, computer system 700 comprises an interconnect medium or bus 711 for communicating information, and an integrated circuit component such as a processor 712 coupled with bus 711 for processing information. One or more of the components in the computer system 700 such as the processor 712 may communicate to a chip set 736 over the shared bus 711. The chip set 736 may also contain components such as a graphics rendering engine 738, a first memory 740, such as a cache, buffer, register or other similar storage device, a second memory 742, a comparator 750, an arithmetic logic unit 752, etc that communicate with each other over point to point interconnect medium.

Computer system 700 may further comprises a random access memory (RAM), or other dynamic storage device 704 (referred to as main memory) coupled to bus 711 for storing information and instructions to be executed by processor 712. In an embodiment, the Processor 712 may include a microprocessor, but is not limited to a microprocessor, such as a Pentium IV, etc. The computer system may be implemented as a desk top, handheld, laptop, or other similar device.

Computer system 700 also comprises a read only memory (ROM) and/or other static storage device 706 coupled to bus 711 for storing static information and instructions for processor 712. The static storage device 706, such as a magnetic disk, or optical disk, hard drive, etc may couple to bus 711 and storing information and instructions.

Computer system 700 may further comprise a display device 721, keyboard 722, cursor control device 723, as well as other similar components. Each component on the computer system may act as an agent transmitting or receiving information across a point to point interconnect medium or shared interconnect medium.

The low latency deskew logic may be used in many applications such as in coherent memory applications like Fully Buffered DIMMS, DDR, as well as applications such as PCI-Express, S-ATA etc. The deskew logic allows a multi-lane design to be unencumbered by lane-to-lane routing constraints.

The software used to design and create the above circuits implementing the deskewing logic can be embodied onto a machine-readable medium. A machine-readable medium includes any mechanism that provides (i.e., stores and/or transmits) information in a form accessible by a machine (e.g., a computer, network device, personal digital assistant, manufacturing tool, CNC machine, any device with a set of one or more processors, etc.). For example, a machine-readable medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While some specific embodiments of the invention have been shown, the invention is not to be limited to these embodiments. For example, the electronic components in the block diagrams may be replaced with other Boolean logic components to perform an essentially similar function. The AND logic gate in FIG. 2 can be replaced to support a transition of a 0 to 1 from the D-flip flops rather than a 1 to 0 transition simply by adding inverters or NOT gates to each of the inputs of the AND gate. Logic can be configured to change states on negative edges of pulses rather then positive edges of pulses. The invention is to be understood as not limited by the specific embodiments described herein, but only by scope of the appended claims.

We claim:

1. An apparatus, comprising:
an input output circuit with a deskewing logic configured to determine the number of input output circuit clock pulses for each lane as a skew delay time relative to a lane with a greatest skew delay to complete a deskew operation based on an actual skew present between lanes carrying signals with information that each have embedded timing information that relates to each other, wherein the deskewing logic includes a digital skew correction circuit to introduce delay in one or more lanes of the plurality of lanes to match the skew delay time of each lane.

2. The apparatus of claim 1, wherein the deskewing logic includes a triggering circuit to start the deskew operation between the lanes after both an initialization sequence occurs in a protocol establishing a communication link between an agent transmitting information and the input output circuit, and the lane with the greatest skew delay has been detected.

3. The apparatus of claim 2, wherein the deskewing logic further comprises one or more circuits to receive an input from the triggering circuit in order to store the skew delay time of each lane relative to the lane with the greatest skew delay.

4. The apparatus of claim 1, wherein the input output circuit with the deskewing logic is located on a physical layer in an agent employing a multiple layer architecture.

5. A system, comprising:
a first agent acting as transmitter;
a second agent acting as receiver;
an interconnect medium having two or more lanes to carry information in multiple signals that each carry embedded timing information that relates to each other, and the two or more lanes have different propagation delays for transmission of data on the two or more lanes, wherein the second agent contains deskewing circuitry located in a physical layer to deskew information received from the first agent in order to restore a time reference between the multiple signals with respect to each other; and
an analog skew delay circuit in the second agent to insert an analog delay into each lane inversely proportional to approximately a period of an actual skew present in that lane compared to a skew delay present in a lane with a greatest skew delay time.

6. The system of claim 5, further comprising:
a data link-layer in the first agent to provide a deskew training sequence within a protocol that initiates a deskew operation in the deskewing circuitry.

7. The system of claim 6, wherein a length of the deskew training sequence is dependant on the number of the lanes in the interconnect medium and a maximum expected skew delay time between the lanes.

8. The system of claim 6, wherein a length of the deskew training sequence is modifiable in the protocol to account for different system architectures.

9. The system of claim 5, wherein the deskewing circuitry has logic to detect an assertion of a control signal from a layer different then the physical layer in the second agent after a component level reset occurs.

10. The system of claim 5, further comprising:
a first status register in the deskewing circuitry to store a skew delay time of a first lane relative to a skew delay time of the lane with the greatest skew delay time.

11. The system of claim 5, wherein the deskewing circuitry has a counter circuit for each lane to determine and to store a skew delay time of that lane relative to a skew delay time of a slowest lane based upon using a clock speed of an input output circuit in the second agent as a reference time interval.

12. A system, comprising:
a first agent acting as transmitter;
a second agent acting as receiver; and
an interconnect medium having two or more lanes to carry information in multiple signals that each carry embedded timing information that relates to each other, and the two or more lanes have different propagation delays for transmission of data on the two or more lanes, wherein the second agent contains deskewing circuitry located in a physical layer to deskew information received from the first agent in order to restore a time reference between the multiple signals with respect to each other, and
wherein the deskewing circuitry includes a first counter circuit to determine skew present in a first lane after a data link layer in the second agent asserts a control signal and a lane with a greatest amount of skew delay experiences a transition from a training sequence.

13. The system of claim 5, wherein the deskewing circuitry located in the physical layer is in an input output circuit.

* * * * *